Figure 1:
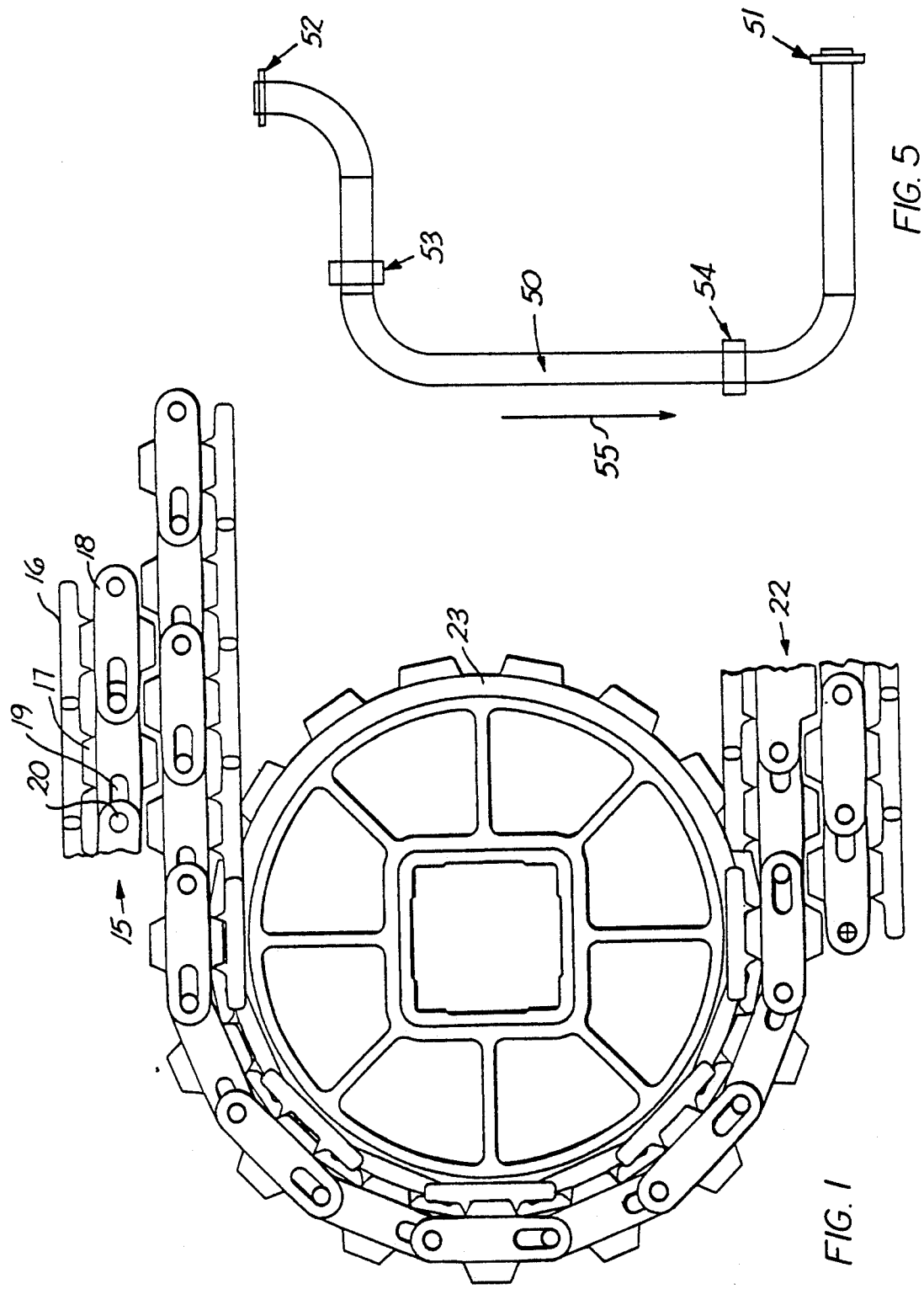

United States Patent [19]

Kissee

[11] Patent Number: 5,303,817
[45] Date of Patent: Apr. 19, 1994

[54] DRIVE SYSTEM FOR MODULAR LINK CONVEYOR BELTS

[75] Inventor: Darrell E. Kissee, Kenner, La.

[73] Assignee: The Laitram Corporation, Harahan, La.

[21] Appl. No.: 82,444

[22] Filed: Jun. 25, 1993

[51] Int. Cl.$^5$ ............................................. B65G 23/14
[52] U.S. Cl. .................................... 198/833; 198/850
[58] Field of Search ............... 198/833, 841, 842, 832, 198/849, 850

[56] References Cited

U.S. PATENT DOCUMENTS

| | | | |
|---|---|---|---|
| 812,374 | 2/1906 | Smead | 198/833 |
| 1,939,315 | 12/1933 | Paulson | 198/833 |
| 1,960,719 | 5/1934 | Stibbs | 198/833 X |
| 2,405,530 | 8/1946 | Sullivan | 198/833 |
| 2,868,356 | 1/1959 | Haaf | 198/833 |
| 3,033,353 | 5/1962 | Burnett et al. | 198/833 |
| 3,666,085 | 5/1972 | Folkes | 198/833 X |
| 3,797,635 | 3/1974 | Boisen et al. | 198/850 X |
| 4,058,204 | 11/1977 | Arieh | 198/833 |
| 5,174,437 | 12/1992 | Burger | 198/833 X |

Primary Examiner—James R. Bidwell
Attorney, Agent, or Firm—Laurence R. Brown; James T. Cronvich

[57] ABSTRACT

Plastic modular link belt conveyors are provided with an inner drive belt system disposed along a variable length of the conveyor belt at one or more positions to produce various advantages including operation of longer belts and those which have curved conveyance paths. The modular characteristics of these drive systems permit custom design in the field for different conveyor loadings, paths and loads. Thus, belt life and performance is enhanced by driving a belt with a belt drive system. The system advantageously uses standard modules of one type in both the driven and driving belts. Thus the modules have similar manufacturing tolerances and temperature characteristics. Pivoted link modules with oblong apertures in the belt drive system permits choices of modules for belt constructions compatible with curved paths. The modularized belt systems are versatile for adaptation to such applications as wide bricklayered modular belts and non-conventional conveyor needs. In the drive system integrally formed gear teeth on the modular links intermesh in the space between the transverse pivot rods in the respective innermost driving belt and the outermost driven belt. By running the inner drive belt "inside-out" modular links with drive tooth appendages extending from opposite belt sides, standard modules of the type having special conveyance structure on the conveying belt side may be used in the driving belt.

13 Claims, 3 Drawing Sheets

DRIVE SYSTEM FOR MODULAR LINK CONVEYOR BELTS

TECHNICAL FIELD

This invention relates to modular conveyor belts of variable widths and lengths formed from pivoted links, preferably plastic, and more particularly it relates to modular driving belt loops in surface to surface driving relationship to the conveyor belts as locomotion means for the modular conveyor belts.

BACKGROUND ART

Modular link conveyor belts are conventionally formed as belt loops driven by power driven sprocket wheels located at one or two ends of the loop. For heavily loaded belts the power drive system dependent upon a few sprocket teeth about the sprocket wheel in driving contact with the belt modules passing over the wheel presents a series of problems. With strong sprocket teeth and powerful drive forces plastic belts wear and have short life. Also the drive forces ar not usually at the most heavily loaded portions of the belt and must transmit the drive forces through a chain of link to pivot rod couplings, thus creating tension in the belt requiring heavy duty modules. Furthermore the loading at the pivot joint accelerates wear. This type of drive system is particularly unacceptable in long belts or belts disposed in curved paths.

Conveyor belt and chain drive systems that employ a loop belt in place of a drive sprocket to drive a conveyor belt system have been proposed in the prior art for distributing driving forces over a longer conveyor belt portion and thus reducing tension in the conveyor belt. U.S. Pat. Nos. 1,939,315, Paulson, Dec. 12, 1933; 1,960,719, Stibbs, May 29, 1934; 2,405,530, Sullivan, Aug. 6, 1946; 2,868,356, Haaff, Jan. 13, 1959; and 4,058,204, Arich, Nov. 15, 1977 represent these prior art drive systems. These systems, in general, are not compatible with modular link belts having pivotable plastic links which ar subjected to significant wear and excessive belt tension in the presence of heavy or variable loading.

Also in these prior art drive systems there are many other deficiencies and limitations, particularly for universal usage with a large variety of conveyor systems employing belts of various widths, lengths and travel path configurations where drive belts require a variety of configurations. One serious deficiency in custom made complex drive belts adapted to various conveyor belt conditions is the necessity to produce and stock special drive belt links in relatively small quantities thereby significantly increasing the cost of the driving belt systems.

Conveyor belts that travel about curved paths in particular present driving problems not solved by the prior art.

A significant problem not addressed by the prior art is the compatibility of the drive belt with the conveyor belt under actual working conditions. For example if there are different dimensional changes in the modules of the respective belts in response to temperature or manufacturing tolerances, the two belts will incur incompatibility resulting in interference, power loss and increased wear.

It is accordingly an object of this invention to provide improved conveyor belt drive systems of the type that engage a modular link conveyor belt in a driving relationship by an endless loop modular driving belt extending along a significant portion of the modular link belt length, thereby to relieve tension, reduce wear and relate driving forces to load bearing portions of the conveyor belt.

A further object of the invention is to provide conveyor belt drive systems of significantly universal adaptability to belts of various lengths, widths, loadings and path configurations.

Another object of the invention is to provide plastic modular link driving belt systems for engaging a plastic modular link conveyor belt with compatible performance under working conditions.

DISCLOSURE OF THE INVENTION

In a preferred embodiment of this invention therefore a modular plastic link conveyor belt is driven by a modular plastic link driving belt loop with identical links employed in each belt to compatibly operate in the presence of changing loads and temperatures.

The drive system of this invention is universally adaptable to various belt configurations without the requirement for stocking special modular links. Thus, one or more narrow drive belt loops may drive wider conveyor belts and several drive belt loop units may be inserted at key load bearing positions in the conveyor belt to bear the loading with less belt tension and wear, making long belts having conveying surface uninterrupted by transfer gaps feasible. Also the drive belt loops afford special advantages in curved conveyor belt path embodiments and in uninterrupted single-level racetrack configurations.

Other objects, features and advantages of the invention are set forth throughout the following description, claims and drawings.

THE DRAWINGS

Figure 2:
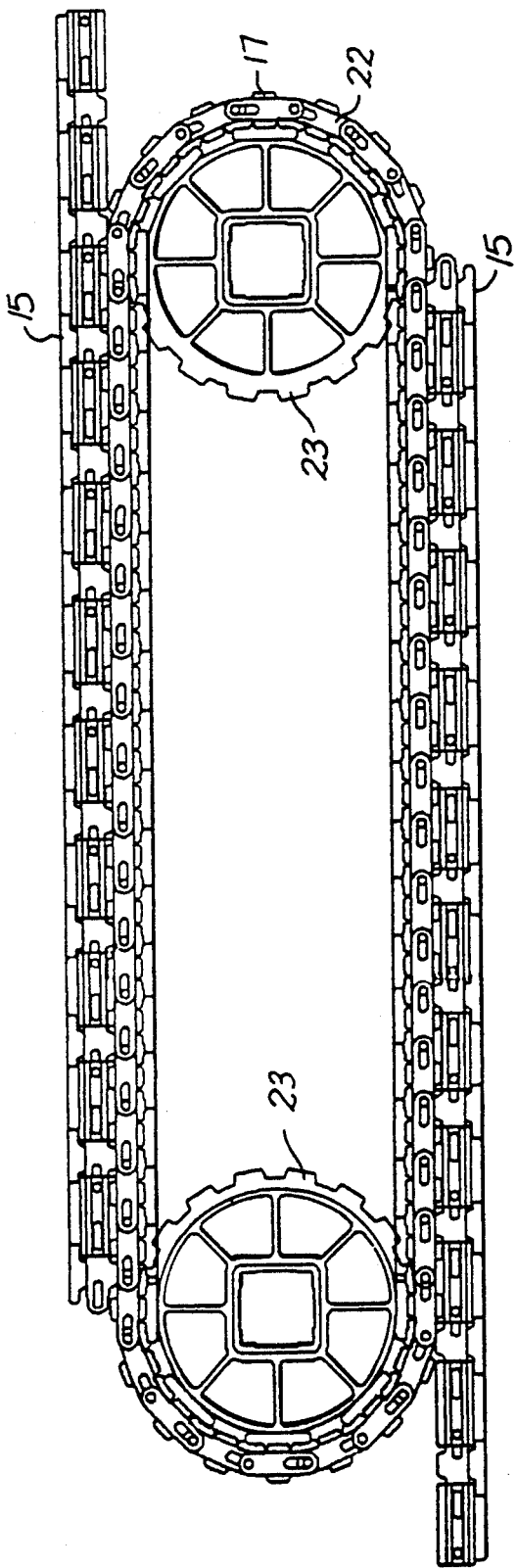
Figure 4B:
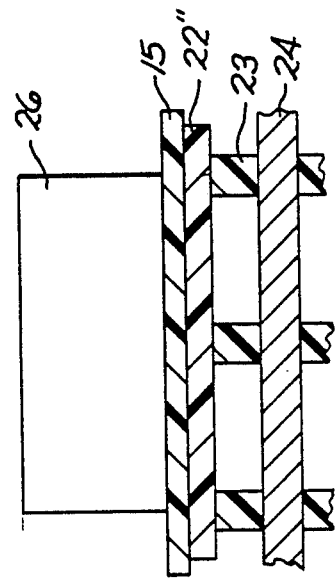
Figure 4A:
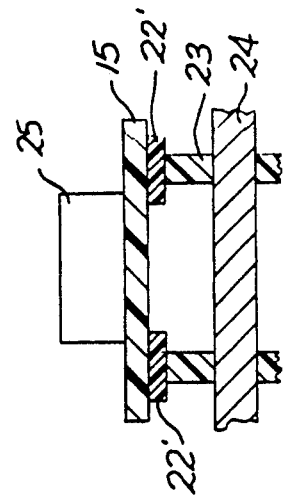
Figure 3:
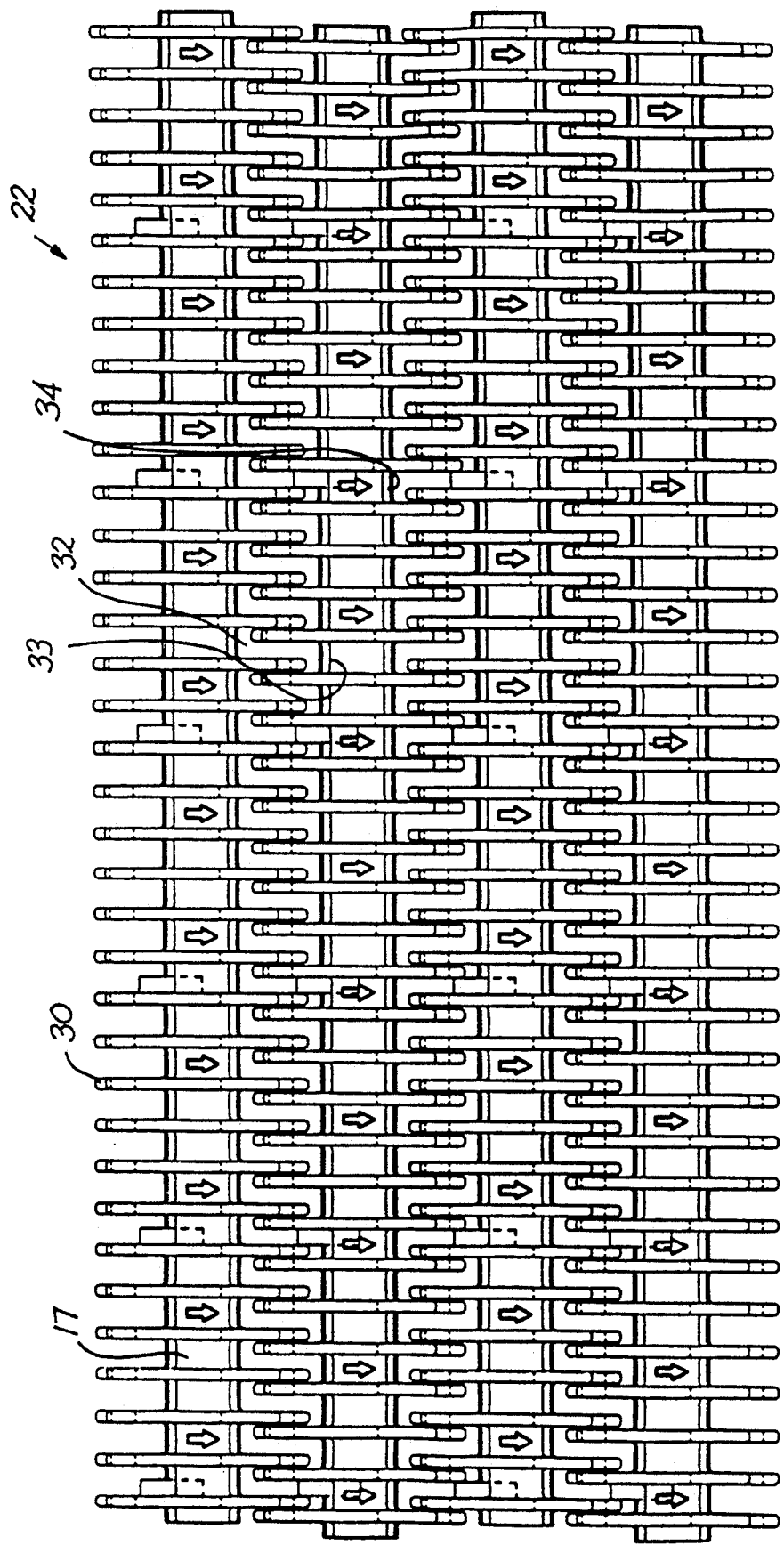

Like reference characters are used for similar features throughout the various views to facilitate comparison. In these drawings:

FIG. 1 is a fragmental side view, partly in section, of a conveyor drive system embodiment of the invention, FIG. 2 is a fragmental side view, partly in section, of a longer section of the conveyor drive system of FIG. 1, FIG. 3 is a plan view of a horizontal segment of the drive belt loop shown in FIG. 1 with the conveyor belt removed, FIGS. 4A and 4B are partial sectional end view sketches of the top portion of conveyor drive system embodiments afforded by this invention along cut-line 1—1 of FIG. 2, and FIG. 5 is a plan view sketch of an embodiment of the conveyor belt drive system for a conveyor having a curved path.

THE PREFERRED EMBODIMENT

As seen from FIG. 1, the fragmental portion of the conveyor belt 15 carries platform members, or raised ribs 16, extending above the drive bars 17 that protrude on either side of the modular links 18. These raised ribs or members 16 convey a load along the path of the conveyor belt 15. Elongated slots 19 on at least one end for journalling pivot rods 20 and the modular links 18 are of the nature set forth in Lapeyre U.S. Pat. No. 4,934,517, Jun. 19, 1990, thereby affording flexibility for the conveyor belt 15 to travel around curved paths, such as shown in FIG. 5. As also shown in FIG. 2, the outermost conveyor loop 15, only partially shown, is driven by an innermost modular plastic link belt loop 22, which in turn is driven by one or more sprocket wheels 23. The drive belt 22 thus serves as an intermediate drive that distributes the drive forces over more modular links than feasible with sprockets, and therefore reduces tensions and wear in the conveyor belt loop 15. To operate long or heavily loaded belts without exceeding the belt's rating, the drive belt 22 can engage the driven belt 15 on the return path as well. It is seen that the drive bars 17 in the space between the pivot rods 20 in the respective belts 15, 22 serve as alternating gear teeth coupled in a drive-driven relationship. In order to achieve this, the driving belt 22 is turned "inside-out" with the platform members 16 disposed innermost.

In such a configuration, the modular links in both the driven conveyor belt and the driving belt are identical. Such a relationship is particularly advantageous in that it assures optimal performance over a large range of operating conditions and over an extended life period. Thus, for example, temperature variations and manufacturing tolerances are similar in both the driven and driving belt modules. Furthermore specialty drive links do not have to be manufactured at higher cost and with special characteristics not present in the mass produced conveyor belt links.

It is seen therefore that drive belt loops of various lengths and widths can be easily fashioned to meet the design criteria for different belt load and operating conditions. For example sprocket wheel 23 at either end of the loop includes one or more power driven sprockets and one or more idler sprockets depending upon the power and loading conditions of any particular belt system. Also the length and width of the driving belt may be configured to best suit the conveyor system under consideration. If there is a special loading condition imposed by a conveyed product or the length of the conveyance path, the drive belt loop can be made longer, or wider, etc. As seen in FIGS. 4A and 4B, which show conveyor belts 15 engaged by drive belts 22', 22" driven by sprockets 23 on a drive shaft 24, the conveyor belts 15 can carry lighter loads 25, or heavier loads 26. Accordingly the drive belts may be narrow or wide, and if more than one across the conveyor belt width they may be placed at strategic loading positions, such as near the edges of the driven belt.

The top view of the wider drive belt embodiment 22 is shown in FIG. 3. The bar drive tooth structure 17 is shown as a common bar extending across the width of the driving belt. In this embodiment the modular links 30 are lined up in parallel and integrally affixed to the bars 17. These modules may extend across the width of the belt or partially across to accommodate "bricklayering" patterns. Alternatively belts may be formed of side by side elemental links, but they are more costly in manufacture and assembly. Sprocket teeth fit in the gaps 32 between the links 30 and drive against the rearward drive surface 33 of the drive bar 17. The forward drive surface 34 of the bar 17 on the opposite side of the belt module 22 drivingly engages the drive bar of the driven belt for the drive-driven relationship between the innermost driving loop and the outermost driven conveyor belt.

Thus this invention affords two adjacent belts, each formed of plastic link modules into endless belt loop assemblies, wherein an innermost belt has drive teeth on its outer surface that intermesh with mating drive teeth on the lower inner surface of the conveyor belt in a driving-driven relationship. The inner belt is powered by a sprocket wheel assembly. The modules form oblong links with parallel upper and lower surfaces disposable along the length of the belt and interconnected with pivot rods passing through apertures near each link end. Drive tooth or bar appendages of generally trapezoidal shape extend from the links on both sides of the belts, and on the conveyor loading side raised ribs extend beyond the teeth to form a load support platform. The inner belt is assembled "inside-out" to put the load support ribs innermost thereby producing a set of intermeshed gear teeth formed by the drive bars disposed between the pivot rods of the respective belts.

The drive system is particularly adaptable to curved conveyor paths, such as illustrated in FIG. 5 with the conveyor belt 50 disposed between the drive sprocket 51 and the idler sprocket 52 in an endless loop driven in the direction of arrow 55. If the driving forces were all delivered by drive sprocket 51, great tension loads would be introduced along the belt, and optimum power would not be applied in the loaded portions of the belt. Thus, if the inner drive belts of this invention are positioned at 53 and 54, each branch of the belt system has a powered sprocket type drive pulling the belt around the respective bends. Other configurations requiring multiple drive positions, for example at heavier loaded work stations along the conveyor belt length, will afford advantages with the belts of this invention.

It is accordingly seen that this invention provides significant improvements in the state of the art, and those features of novelty setting forth the nature and spirit of the invention are defined with particularity in the following claims.

I claim:

1. A conveyor system comprising in combination:
   a driving conveyor belt formed of pivotable modules into an endless loop assembly, said driving belt modules having extending appendages on opposite sides of the driving conveyor belt for respectively engaging a driven conveyor belt and a powered driving source,
   a powered sprocket drive assembly for engaging the driving conveyor belt module appendages on a first side of the driving conveyor belt to move the driving conveyor belt about the endless loop,
   a driven conveyor belt loop formed of pivotable modules and adapted to be driven by the driving conveyor belt module appendages on a second side of the belt, and
   driving means for the driven conveyor belt positioning the driving conveyor belt inside the driven belt loop to engage the driven conveyor belt loop in a driving relationship by driving contact between a plurality of modules in the driving and driven belts along the length of the respective conveyor belt loops.

2. The conveyor system of claim 1 further comprising driving modules in the driving conveyor belt and driven modules in the driven conveyor belt of similar configuration.

3. The conveyor system of claim 2 wherein the similar modules further comprise an oblong links with parallel upper and lower surfaces disposable along the length of the belt, said links having pivot apertures passed through the links at two opposite ends disposable along the length of the belt and wherein said appendages have generally trapezoidal shaped cross sections extending from the parallel surfaces.

4. The conveyor system of claim 2 wherein said modules in both the driving and driven belts support raised ribs extending from one side of the belt beyond said appendages, and said raised ribs are disposed on the outer side of the driven belt and the inner side of the driving belt.

5. The conveyor system of claim 1 wherein the driving conveyor belt is narrower than the driven conveyor belt.

6. The conveyor system of claim 1 further comprising a plurality of said driving conveyor belts coupled in driving relationship with said driven conveyor belt.

7. The system of claim 1 wherein the driven conveyor belt loop has substantially parallel load carrying and return paths, and said driving conveyor belt comprises a loop drivingly engaging both the conveying path and the return path of the driven conveyor belt.

8. In a modular link belt conveyor system with a load bearing conveyor belt driven by a driving belt disposed adjacent a portion of the length of the drive belt, the improvement comprising in combination, interlocking driving modular links in the driving belt and driven modular links in the load bearing conveyor belt of similar configuration having interlocking teeth of similar shape integrally supported by and extending from the respective modular links, means coupling together the respective modular links to pivot about pivot rods transverse to the respective belts and spaced periodically along the length of both said belts, a belt drive system inter-engaging said teeth from the respective belts alternately along a common portion of both said belts respectively with teeth of the driven belt engaging teeth of the driving belt with the inter-engaging teeth of the two belts disposed in a space between the pivot rods of the respective driving and driven belts, and powered driving means for moving the driving belt so that it serves as an intermediate power drive transfer medium from the powered driving means to the conveyor belt.

9. In a modular link belt conveyor system with a load bearing conveyor belt driven by a driving belt disposed adjacent a portion of the length of the drive belt, the improvement comprising in combination, belt link modules of identical configuration, manufacturing tolerances and temperature characteristics pivoted together to form both the conveyor belt and the driving belt.

10. The system of claim 9 further comprising said conveyor belt disposed in a loop between a pair of sprocket wheels to attain a curved path between at least two straight sections with separate driving belts disposed at respective positions along the two straight sections of the conveyor belt path.

11. The system of claim 9 further comprising said conveyor belt of greater width than said driving belt.

12. The system of claim 11 further comprising a plurality of driving belts distributed across the width of the conveyor belt.

13. The system of claim 9 wherein the conveyor belt is disposed about a curved transport path and the belt link modules have pivot pin apertures for coupling end to end in a belt configuration, and presenting an elongated pivot pin aperture that permits the belt to flex when it passes around curves in the conveyor belt transport path.

* * * * *